United States Patent [19]

Eichelberger

[11] 3,783,254

[45] Jan. 1, 1974

[54] LEVEL SENSITIVE LOGIC SYSTEM

[75] Inventor: Edward Baxter Eichelberger, Purdy Station, N.Y.

[73] Assignee: International Business Machines Corporation, Armonk, N.Y.

[22] Filed: Oct. 16, 1972

[21] Appl. No.: 297,543

[52] U.S. Cl. .................................. 235/152, 307/203
[51] Int. Cl. .......................... G06f 7/38, H03k 19/00
[58] Field of Search ........................... 235/152, 156; 307/203

[56] References Cited

UNITED STATES PATENTS

| | | | |
|---|---|---|---|
| 3,707,621 | 12/1972 | Krutz | 235/174 |
| 3,700,868 | 10/1972 | Silvertson | 235/152 |
| 3,619,583 | 11/1971 | Arnold | 235/152 |
| 3,564,226 | 2/1971 | Seligman | 235/164 |

*Primary Examiner*—Malcolm A. Morrison
*Assistant Examiner*—David H. Malzahn
*Attorney*—John F. Osterndorf et al.

[57] ABSTRACT

A generalized and modular logic system for all arithmetic/logical units of a digital computer. Each arithmetic/logical unit of a computer is partitioned into sections formed of combinational logic networks and storage circuitry. The storage circuitry is sequential in operation and employs clocked dc latches. Two or more synchronous, non-overlapping, independent system clock trains are used to control the latches. A single-sided delay dependency is imparted to the system. The feedback connections from the respective latch circuitry are made through combinational logic to other latch circuitry that has a system clock other than the system clock acting on the initiating latch circuitry. With each latch, there is provided additional circuitry so that each latch acts as one position of a shift register having input/output and shift controls that are independent of the system clocks and the system inputs/outputs. All of the shift register latches are coupled together into a single shift register.

20 Claims, 14 Drawing Figures

LEVEL SENSITIVE LOGIC SYSTEM

BACKGROUND OF THE INVENTION

1. Field of the Invention

This invention relates to logic systems for use in general purpose digital computers and, more particularly, to an organization of logic in such systems to render them modular, generalized and level-sensitive.

2. Description of the Prior Art

In the past, the designer of computer logic has had complete flexibility in arranging logic circuitry to implement system and sub-system logic functions in central processing units, channels and control units employed in digital computing apparatus. A significant variety of design implementations has resulted from the exercise of this flexibility. Each of these implementations has its own special dependency on the ac characteristics of the individual circuits employed in the system.

The independence and flexibility characterizing the arrangements of the designer often led to unexpected system timing problems, complicated and complex problems in testing the circuitry, and a significant complexity and detail required for educating the field service personnel for such computing systems. However, it had the advantage of permitting the designer to use all techniques to obtain the best performance by employig the fewest numer of circuits. The interface between the logic designer and the component manufacturer was reasonably well defined and the approach of the past could be supported in component manufacturing since the ac parameters such as rise time, fall time, individual circuit delay, etc., could rather readily be tested.

With the advent of larger scale integration, however, this well defined and reliably tested interface no longer exists. It has become impossible or impractical to test each circuit for all of the well known ac circuit parameters. As a result, it is necessary to partition and divide logic systems and sub-systems into functional units having characteristics that are substantially insensitive to these parameters. Large scale integration provides the ability for the logic designer as well as the component manufacturer to utilize the capacity for placing hundreds of circuits on a single chip of semiconductive material. Such an ability offers the potential for reducing power, increasing speed, and significantly reducing the cost of digital circuits.

Unfortunately, a numer of serious considerations are involved before this potential can be achieved. For example, in a medium sized computing system having approximately 40,000 individual circuits, it has not been uncommon to effect 1500 or more engineering changes during the development period for the product. It is readily apparent that the implementation of such a significant numer of engineering changes approaches the impossible when dealing with the lowest level modular unit of a computer which has hundreds of circuits contained within it.

Another area which must be considered as technology moves into the fabrication of large scale integrated functional units is the product testing required prior to its incorporation into a computing system. The subsequent diagnostic tests performed during field servicing as well as the simulation that is performed during design and manufacturing are factors for consideration in fabricating such functional units.

In the past, each individual circuit has been tested for the usual and normal ac and dc parameters. Access to the modular unit for applying the input test conditions and measuring the output responses has been achieved through a fixed number of input/output connection pins. However, in the realm of large scale integrated functional units, the same number of input/output pins are available, but there is considerably more circuitry.

Thus, in a typical module containing one hundred chips each having up to six hundred circuits with a three hundred circuit average, the module would contain at least 30,000 circuits. Parametric testing of such a unit is not possible. If functional tests are attempted on such a unit, having the prior art logical design configurations, the extent of coverage of testing would be significantly low and the level of reliability for use in a computing system would also be significantly low. Accordingly, provision must be made for eliminating the dependencies of the past. Current logical systems must be avoided and new logic organizations must be utilized in computing systems if the advantages of large scale integration are to be optimized. Testing must be performed in a functional manner on these new logical units, be it at the chip level, the module level, or other level. This testing is accomplished by automatically generating tests that assure the proper operation of every logic element in the unit.

SUMMARY OF THE INVENTION

As contrasted with the prior art organizations and systems of logic, the logic system of this invention are generalized and applicable to all levels of the hierarchy of modular units. The generalized logic systems have a single-sided delay dependency, avoid all race conditions and hazards and eliminate the normal and usual ac timing dependencies. The functional logical units are made solely dependent on the occurrence of the signals from plural system clock trains. This is accomplished by using clocked dc latches for all internal storage circuitry in the arithmetic/logical units of the computing system. This latch circuitry is functionally partitioned along with associated combinational logic networks and arranged in sets. The plural clock trains are synchronous but non-overlapping and independent. The sets of latch circuitry are coupled through combinational logic to other sets of latches that are controlled by other system clock trains or combinations of clock trains. One of the ways to accomplish this objective is to use a different system clock for each one of the sets of latch circuitry.

The logic system of this invention incorporates another concept, aside from the single-sided delay dependency giving hazard and race-free operation. It provides for each latch circuit to include additional circuitry so that each latch functions as a shift register latch having input/output and shift controls that are independent of the system clocks and the system input/outputs. All of these shift register latches are coupled together to form one or more shift registers. Each has a single input, a single output and shift controls.

With this additional circuitry, all of the system clocks can be de-activated, isolating all of the latch circuits from one another, and permitting a scan-in/scan-out function to be performed. The effect is to reduce all of the sequential circuitry to combinational circuitry which is partitioned down to the level of multistage combinational networks. This permits automatic test generation to be performed for testing each circuit in the entire logical unit.

It has been found necessary to reduce sequential logic circuits effectively to combinational logic networks as the problem of automatic test pattern generation is more easily solved for the latter type of network. The concept of the invention provides for the latches to be converted into shift register latches. When this is accomplished, the shift register latches are then employed to shift in any desired test pattern of binary ones and zeros where they are retained for use as inputs to the combinational networks. The results of the combinational logic are clocked into the latches and then shifted out for measurement and comparison to determine the functional response of the logical unit.

The use of these latches enables dc testing of the logic system to be performed. By controlling and measuring the maximum circuit delay through the combinational networks of the entire unit, an appreciation of the ac response for the unit is obtained. With such a system, the state of every latch in the logic system may be monitored on a single cycle basis by shifting out all the data in the latches to some sort of a display device. This may be accomplished without disturbing the state of the sub-system, if the data is also shifted back into the latches in the same order as it is shifted out.

The arrangement has the effect of eliminating the need for special test points in such a system and therefore enables a greater density of circuit packaging to be achieved. Another advantage for such a system is that it provides a simple standardized interface allowing greater flexibility in creating operator or maintenance consoles. The consoles are readily changeable without in any way changing the logic system. Diagnostic tests may be performed under the control of another processor or tester and, in addition, perform such functions as reset, initialization and error recording. One of the most significant advantages of this logic organization and system is that it enables marginal testing to be implemented by merely controlling the speed at which the system clocks operate. From this test data, it can be readily determined as to the speed of response of the functional unit and its possible area of future utilization.

One of the significant features of the invention is the implementation of shift register latches as basic building blocks in a logic organization and system with combinational logic networks which provide the excitation for the shift register latches. Plural clock trains control groups of the shift register latches in the operation of the system. Independent accessing and controls are also provided for these latches for the independent scan-in/scan-out function to be performed.

DESCRIPTION OF THE PREFERRED EMBODIMENT

Figure 1:
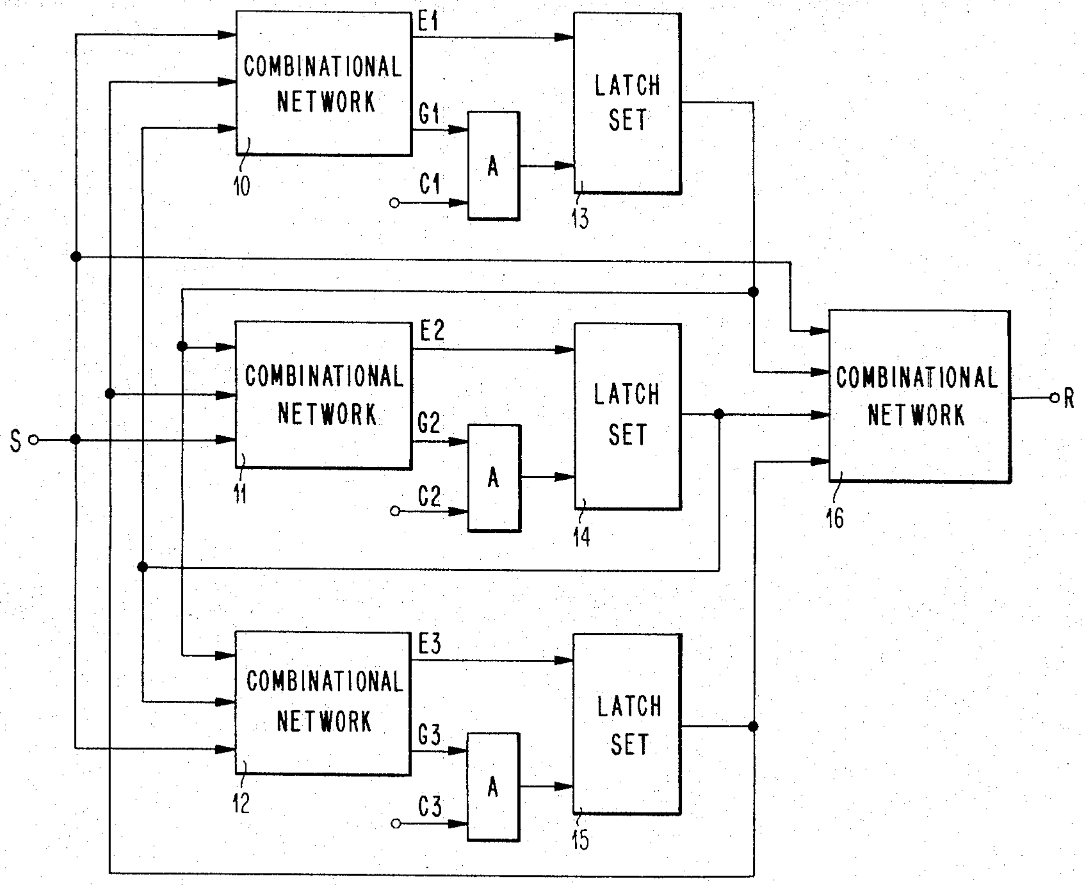
FIG. 1 is a schematic diagram of the organization of a generalized logic system embodying the principles of the invention.

The generalized and modular logic system of the invention has a common organization and structure. It is applicable to any arithmetic or logical unit of a computing system, hereinafter referred to as an ALU. A system or subsystem in accordance with the invention would form all or a substantial functional part of a central processing unit, a channel or a control unit in the computing system. Such an organization and structure assists in large scale integrated chip and module testing, field diagnostics and technology upgrading. Almost all functions implementable by an arrangement of logic circuits can be implemented using this organization and structure. For economic reasons, pure storage functions, such as memory arrays, register arrays, etc, would not normally be implemented in this way. However, control logic associated with these storage functions could also be implemented in it. As will be apparent from the description which follows hereinafter, non-digital functions such as analog circuits and sense amplifiers may not be organized according to the principles of the invention.

The logic configuration of the invention is characterized by having a single-sided delay dependency. The logic organization employs the concept of configuring so that correct operation of the structure is not dependent on rise time, fall time or minimum delay of any individual circuit in a functional unit. The only dependency is that the total delays through a number of levels or stages of logic is less than some known value. Such a configuration is referred to as a level sensitive.

For purposes of definition, a logic system is level sensitive if, and only if, the steady state response to any allowed input state change is independent of the circuit and wire delays within the system. Also, if an input state change involves the changing of more than one input signal, then the response must be independent of the order in which they change.

It is readily apparent from this definition that the concept of level sensitive operation is dependent on having only allowed input changes. Thus, a level sensitive configuration includes some restriction on how the input signal changes occur. As will be described more fully hereinafter, these restrictions on input changes are applied amost exclusively to the system clocking signals. Other input signals such as data signals have virtually no restrictions on when they may occur.

The term "steady state response" refers to the final value of all internal storage elements such as flip flop or feedback loops. A level sensitive system is assumed to operate as a result of a sequence of allowed input stage changes with sufficient time lapse between changes to allow the system to stabilize in the new internal state. This time duration is normally assured by means of the system clock signal trains that control the dynamic operation of the logic configuration.

The logic organization of the invention also incorporates the concept of configuring all internal storage elements so that they may function as shift registers or portions of shift registers. To implement this concept, all storage within the logic organization is accomplished by utilizing latches that are free of hazards or race conditions, thereby obtaining logic systems that are insensitive to ac characteristics such as rise time, fall time and minimum circuit delay.

The latches are level sensitive. The system is driven by two or more non-overlapping clock signal trains that are independent of each other. Each of the signals in a train need have a duration sufficient only to set a latch. The excitation signal and the gating signal for any clocked latch are a combinational logic function of the system input signals and the output signals from latches that are controlled by other clock signal trains from the train providing an input to such clocked latch.

One way to accomplish this latter objective, to be described more fully hereinafter, is to have each such clocked latch controlled by exactly one of the system clock signals. When the gating signal and clock signal are both in an "on" or "up" condition, the clocked latch is set to the state determined by the excitation signal for that latch.

A generalized logic organization and structure incorporating these concepts is shown in FIG. 1. The configuration is formed of a plurality of combinational logic networks 10, 11, 12, arranged in parallel. Each network is coupled into a set of latches 13, 14, 15, respectively. Effectively then, the logic system is partitioned into a plurality of parts each of which is composed of a combinational network and a set of latches. Although three such partitions are shown, it is to be understood that any number more or less than the number shown may be arranged in parallel in accordance with the invention. The system also includes an additional combinational network 16 for accepting the latch set output signals and for generating system output signals designated as a set of such signals, R. Network 16 is shown as responding to input signal set S as well as the indications from latch sets 13, 14, 15. It is to be understood that the system response R may be any logical function of the latch set outputs and the set of input signals.

Each of the combinational networks 10, 11, 12 is a multiple input, multiple output, logic network. It includes any number of levels or stages of combinational circuits which may take the form of conventional semiconductor logic circuits. Although the networks in most instances in such a system are complex and include a number of stages of logic, it is to be understood, as will be described more fully hereinafter, that the networks may be simplex or trivial and consist only of conductors from one set of latches to another.

Each network is responsive to any unique input combination of signals to provide a unique output combination of signals. The output signals such as E1, E2, E3 are actually sets of output signals so that the symbol E1 stands for *e*11, *e*12 . . . *e*1N. Similarly, the symbols G1, G2 and G3 refer to sets of gating signals that may be provided by each of the combinational networks, respectively. The input signals provided to the combinational networks are the external input signals indicated as a set S of such signals and sets of feedback signals from the combinational networks and latch sets. It is to be understood throughout the description of this invention that the term "set" shall mean a single item or a substantial plurality of such items.

It is a necessary requirement of this generalized structure that two or more independent clock signal trains be employed to control the clocking of the signals in the unit. As already stated, a latch or latch set controlled by one clock signal train cannot be coupled back through combinational logic to other latches that are controlled by the same clock signal train. Thus, the output from latch set 13 cannot be coupled back into combinational network 10, as latch set 13 is responsive to clock train C1. However, this latch set can be coupled to combinational networks 11 and 12, both of which are responsive to different clock trains.

One way of implementing this requirement is to provide a separate clock for each partition, as shown in FIG. 1. Thus, clock train C1 is coupled into latch set 13, clock train C2 into latch set 14 and clock train C3 into latch set 15. The manner in which each latch set is controlled by exactly one of these clock signal trains is for each controlling clock signal Ci to be associated with a latch Lij receiving two other signals: an excitation signal Eij and possibly a gating signal G*ij*. These three signals control the latch so that when both the gating signal and the clock signal are in an "up" state or binary one condition, the latch is set to the value of the excitation signal. When either the clock signal or the gating signal is a binary zero or in a "down" state, the latch cannot change state. It is also to be understood that the clocking may be accomplished by having the clock signal trains act directly on the respective latch sets without utilizing the sets of gating signals G1, G2, G3 and the intermediary AND gates.

Figure 2:
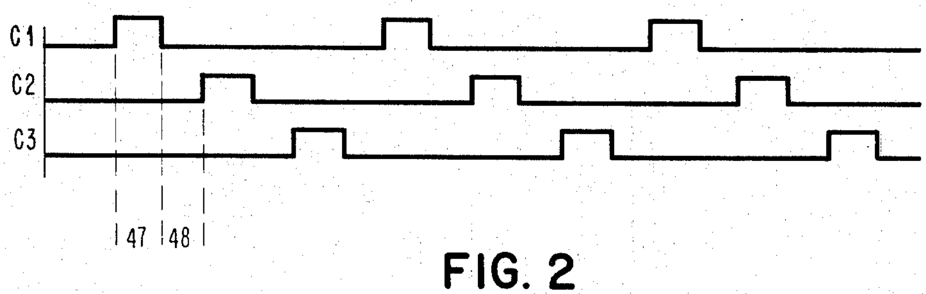
FIG. 2 is a timing diagram of the system clocking employed with the logic system of FIG. 1.

The operation of the logical system is determined by the clock signal trains. With reference to FIG. 2, with the rise of C1 in time frame 47, both C2 and C3 are zero and the inputs and outputs of combinational network 10 are stable. If it is assumed that the external set of inputs S are also not changing, clock signal C1 is then gated through to the latches of set 13 if the corresponding set of gating signas G1 are at an "up" or binary one level. The latches of set 13 are set to the value of their set of excitation signals E1. Thus, some of the latches in latch set 13 may be changed during the time that C1 is in an "up" state. The duration of time frame 47 need only be long enough for the latches to be set. The signal changes in the latches immediately propagate through combinational networks 11, 12 by means of the feedback connections. They also propagate through combinational network 16.

Before clock signal C2 can change to an "up" or binary one condition, the output signals from latch set 13 have to complete propagation through combinational networks 11, 12. This duration between clock signals C1 and C2 occurs in time frame 48 which must be at least as long as the propagation time through network 11.

When clock signal C2 is changed from a "down" condition to an "up" condition, the process is continued with the latches in set 14 storing the excitation signals from network 11. In similar manner, clock signal C3 is changed to an "up" condition to latch set 15. Thus, for proper and correct operation of the logic system, it is necessary that the clock signals have a duration long enough to set the latches and a time interval between signals of successive clock trains that is sufficient to allow all latch changes to finish propagating through the combinational networks activated by the feedback connections. Such operation meets the requirement for a level sensitive system and assures a minimum dependency on ac circuit parameters.

Information flows into the level sensitive logic system through the set of input signals S. These input signals interact within the logic system by controlling them using the clock signals that are synchronized with the logic system. The particular clock time in which the signals change is controlled and then the input signal is restricted to the appropriate combinational networks. For example, with reference to FIG. 1, if the set of signals S always changes at clock time C1, set S may be employed as an input to combinational network 11 or 12 but not as an input to network 10.

If the external input signals are asynchronous in that they change state at any time, then the manner of handling these signals within the logic system is accomplished by synchronizing them using latches. A latch receives as inputs one of the excitation signals as well as the particular clock signal. As the latch cannot change when the clock signal is at a "down" or binary zero condition, the output of the latch only changes during the period when the clock pulse is in an "up" or binary one condition. Even if the set of input signals S changes during the time when the clock signal is in the "up" condition, no operational problem occurs. If the latch almost changes, a spike output might appear from the latch during the time when the clock pulse is in the "up" condition. However, this does not create any problems since the output of this latch is employed only during another clock time.

External output signals, such as the set of responses R, normally do not cause any problem unless there are critical restrictions regarding the timing of the output. For consistency and simplicity, most output signals are probably some function of the latch outputs that are all controlled by the same clock signal. Thus, they remain at a given value for a given number of clock cycles.

It is apparent from FIGS. 1 and 2 that the proper operation of the logic system is dependent only on the propagation time or delay through the combinational networks 10, 11, 12. This delay (time frame 48) must be less than the corresponding time lapse between successive clock signals. If it is not, then the sets of latches cannot be set. This final timing dependency is eliminated by providing the capability of system retry at a slower clock speed. The use of longer clock pulses with more lapsed time between clock signals results in successful retry, even if the error was caused by a timing problem in the system. This approach provides improved system reliability, reduces no trouble found service calls in the field, and reduces the exposure to incomplete ac testing of highly dense logic chips.

A logic system having a single-sided delay dependency has the advantage of permitting the system to be modeled in slower speed functional unit logic that is readily changeable during developmental stages of the technology of implementation. The transition from unit logic to large scale integrated logic is then made with the only exposure being the maximum speed at which the chip successfully operates. If the circuit delays were different in the highly integrated version than anticipated, it would mean solely that the system would have to be run at a slower speed. It thus, provides the capability for marginal testing for timing. For example, a worst case logic pattern is circulated in the system while the clock speed is slowly increased. Once the failing clock speed is established, either the clock is set for reliable operation or the failing unit is replaced with one that operates reliably at the rate of speed.

It has been emphasized that one of the significant objectives in such a generalized logic system as shown in FIG. 1, is to obtain a system that is insensitive to ac characteristics. To accomplish this, the storage elements within such a system are level sensitive devices that do not have any hazard or race conditions. Circuits that meet this requirement are generally classified as clocked dc latches. A clocked dc latch contains two types of inputs: data inputs and clock inputs. When the clock inputs are all in some state for example, a binary zero state, the data inputs cannot change the state of the latch. However, when a clock input to a latch is in the other state, that is, a binary one state, the data inputs to that latch control the state of the latch in a dc manner.

Figure 3:
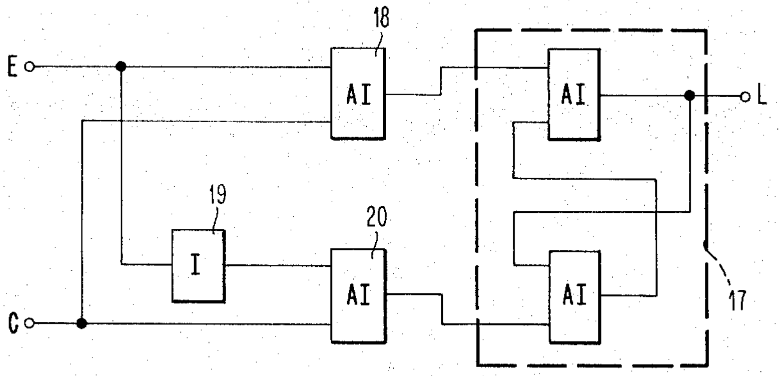
FIG. 3 is a block diagram of one form of a clocked dc latch implemented in AND Invert gates for use in the logic system of FIG. 1.
Figure 4:
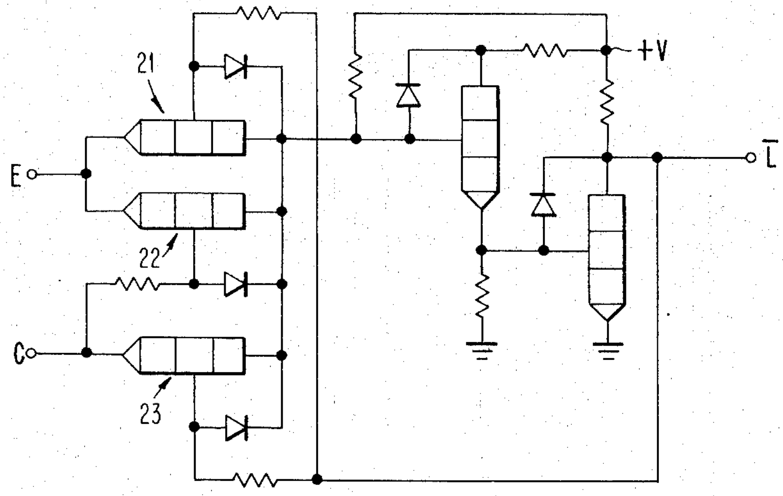
FIG. 4 is a circuit diagram of a latch performing the inverse of the same function as the one shown in FIG. 3.

One such latch of the dc clocked type is the polarity hold latch implemented in FIG. 3 in AND Invert gates, and in FIG. 4 in semiconductor logic circuitry. In FIG. 3, the storing portion of the latch is indicated at 17. FIG 3 employs AND Invert gates 18, 20 and inverter 19. The equivalent transistor circuitry in FIG. 4 includes the transistor inverters 21, 22, 23 arranged in combinational logic circuits with transistors 21 and 23 included in the feedback circuits for the storing circuitry.

The polarity hold latch has input signals E and C and a single output indicated as a L. In operation, when clock signal C is at a binary zero level, the latch cannot change state. However, when C is at a binary one level, the internal state of the latch is set to the value of the excitation input E.

Figure 5:
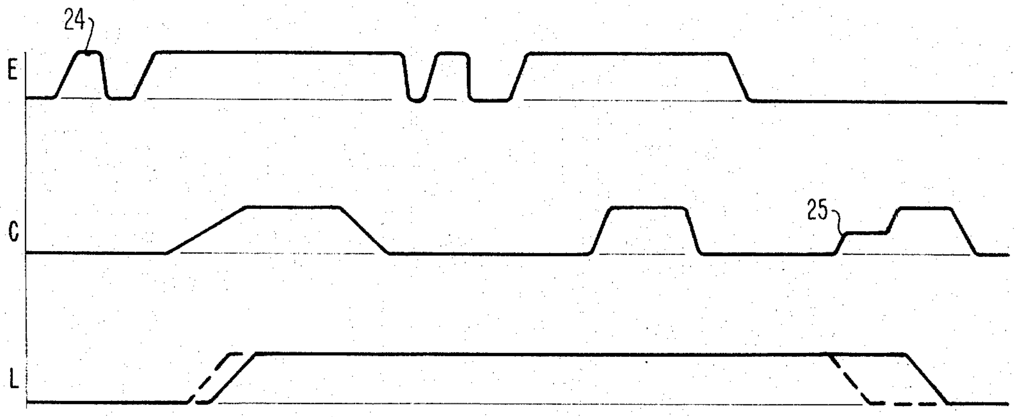
FIG. 5 is a timing diagram for the latch of FIG. 3.

With reference to FIG. 5, under normal operating conditions clock signal C is at a binary zero level (for purposes of description, the lower of the two voltage levels) during the time that the excitation signal E may change. Maintaining signal C in the binary zero conditions prevents the change in excitation signal E from immediately altering the internal state of the latch. The clock signal normally occurs (binary one level) after the excitation signal has become stable at either a binary one or a binary zero. The latch is set to the new value of the excitation signal at the time the clock signal occurs. The correct changing of the latch is therefore not dependent on the rise time or the fall time of the clock signal, but is only dependent on the clock signal being a binary one for a period equal to or greater than the time required for the signal to propagate through the latch and stabilize.

The signal pattern of FIG. 5 indicates how spurious changes in the excitation signal do not cause the latch to change state incorrectly. Thus, the spurious change at 24 in excitation signal E does not cause a change in the state of the latch as indicated by the output signal characteristic L. In addition, poorly shaped clock signals such as at 25 do not result in an incorrect change in the latch. These characteristics of the polarity hold latch are employed in the generalized structure for the logic system of FIG. 1.

Figure 6:
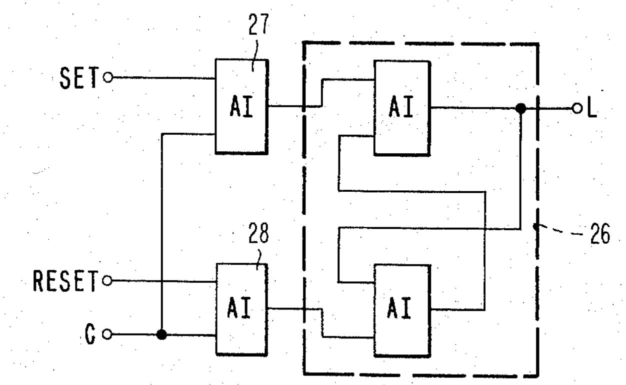
FIG. 6 is a block diagram of another clocked dc latch which may be employed in the logic system of FIG. 1.

Referring now to FIG. 6, there is shown another latch circuit employable as a sequential circuit in a level sensitive logic system. This latch is a closed set-reset latch in which the latching portion is indicated at 26. It receives its inputs from the AND Invert logic circuits 27, 28 which are coupled, respectively, to set and reset inputs and to a clocking signal train at C. The output signal indicative of the latch state is provided at L.

It is also a feature of the generalized logic system of this invention to provide the ability to monitor dynamically the state of all internal storage elements. This ability eliminates the need for special test points, it simplifies all phases of manual debugging, and provides a standard interface for operator and maintenance consoles. To achieve this ability, there is provided with each latch in each latch set of the system, circuitry to allow the latch to operate as one position of a shift register with shift controls independent of the system clocks, and an input/output capacity independent of the system input/output. This circuit configuration is referred to as a shift register latch. All of these shift register latches within a given chip, module, etc, are interconnected into one or more shift registers. Each of the shift registers has an input and output and shift controls available at the terminals of the package.

By converting the clocked dc latches into shift register latches, the advantages of shift register latches are present. These include the general capability of stopping the system clock, and shifting out the status of all latches and/or shifting in new or original values into each latch. This capability is referred to as scan-in/scan-out or log-in/log-out. In the testing of the functional unit, dc testing is reduced from sequential testing to combinational testing which is substantially easier and more effective. For ac testing the well-defined ac dependencies, the scan-in/scan-out capability provides the basis for efficient, economical, and effective ac tests. Scan-in/scan-out provides the necessary capability for accurately diagnosing both design errors and hardware failures for system bring-up, final system tests and field diagnostics. The shift registers are also usable for system functions such as a console interface, system reset, and check pointing.

Among these advantages, the most significant are those that accrue in the area of testing. Although methods of both dc and ac testing are hereinafter generally described, it is to be understood that they are not included within the subject matter of this invention but are included within application Ser. No. 298,071, filed Oct. 16, 1972, entitled, "Method of Propagation Delay Testing a Functional Logic System" and Application Ser. No. 298,087 filed Oct. 16, 1972, entitled, "Method of Level Sensitive Testing a Functional Logic System." These applications were filed concurrently with this application in the name of Edward B. Eichelberger. All of these applications are assigned to the same assignee. However, the circuitry necessary to accomplish this testing does constitute a part of this invention.

Heretofore, the circuits on a semiconductor chip have been sufficiently simple that considerable ac and dc testing could be performed to assure proper device and circuit operation. Subsequent testing at the module or card levels then concentrated on proper dc operation. Such testing verified that the circuits were correctly interconnected and had not been adversely affected by any of the steps in the fabrication processes. However, with the advent of large scale integration where a chip contains as many as 300 to 500 circuits, detailed ac testing is no longer possible and dc testing is extremely difficult due to the complexity of the functional unit under test and the significant change in the circuit to pin ratios on the chip.

As is well known in the art, the problem of automatically generating test patterns for combinational logic networks is relatively simpler than the generation of test patterns for complicated sequential logic circuits. Accordingly, it is necessary to render the sequential logic circuits such as the internal storage circuit of the generalized logic system to a form which permits the same type of test pattern generation to be employed as that used for combinational networks. This is accomplished by including additional circuitry for selectively converting the clocked dc latches into shift register latches.

Figure 7:
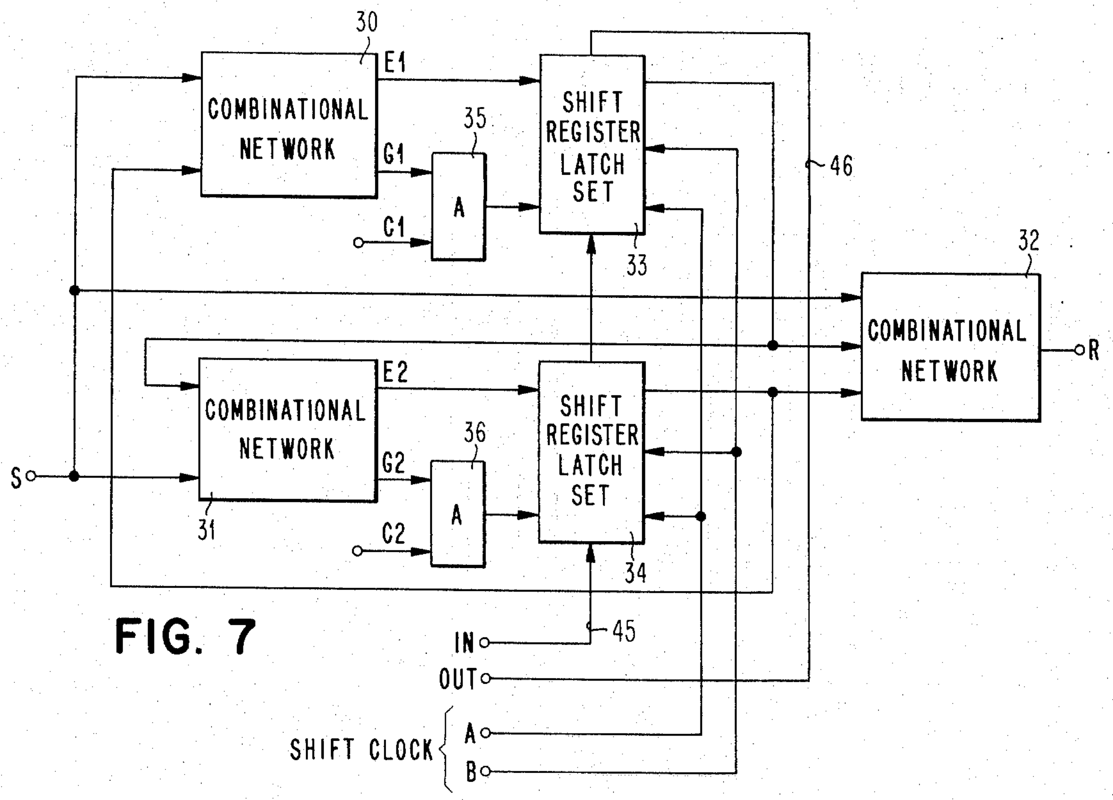
FIG. 7 is a schematic diagram of the organization of a generalized logic system having provision for accomplishing scan-in/scan-out of the system.

Referring to FIG. 7, a logic system with two clock signals and two sets of register latches is shown. Combinational networks 30, 31, 32 are of the same type and nature as those described in connection with FIG. 1. They respond to sets of input signals S as well as to the latch back signals provided by sets of latches 33, 34. The combinational networks 30, 31 each provides a set of excitation signals E1, E2 and a set of gating signals G1, G2. Through AND gates 35, 36 system clocks C1, C2 are gated to the latch sets 33, 34, respectively.

Latch sets 33, 34 differ from those of FIG. 1 in that they are connected as shift register latches. Such a shift register latch is shown in symbolic form in FIG. 8 as including two distinct latching or storing circuits 37, 38. Latch 37 is the same as the latch circuits employed in the latch sets of FIG. 1 and as shown in one form in FIG. 3. Each such latch has an excitation input E, a clock signal train input C, and an output indicated as L.

Latch 38 is the additional circuitry so as to render the structure as a shift register latch. It includes a separate input U, a separate output V, and shift controls A and B. The implementation of the shift register latch in AND Invert gates is shown in FIG. 9.

Indicated in dotted line form is latch 37 which is the same as the latch of FIG. 3. The additional input U is provided through AND Invert logic including gates 39, 40 and inverting circuit 41. This circuitry also accepts the first shift control input A. From these gates 39, 40 coupling is made to the latch circuit 37. From the outputs of latch 37, there is provided a second latching circuit including the latch configuration 42 and the AND Invert gates 43, 44 which accept the outputs from the latch configuration of circuit 37 as well as the second shift control input B.

Circuit 42 acts as a temporary storage circuit during the shifting in and shifting out operation of the arrangement. These shift register latches are employed to shift any desired pattern of ones and zeros into the polarity hold latches 37. These patterns are then employed as inputs to the combinational networks. The outputs from circuit 37 are then clocked into the latch circuit 42 and shifted out under control of shift signal B for inspection and measurement.

Figure 9:
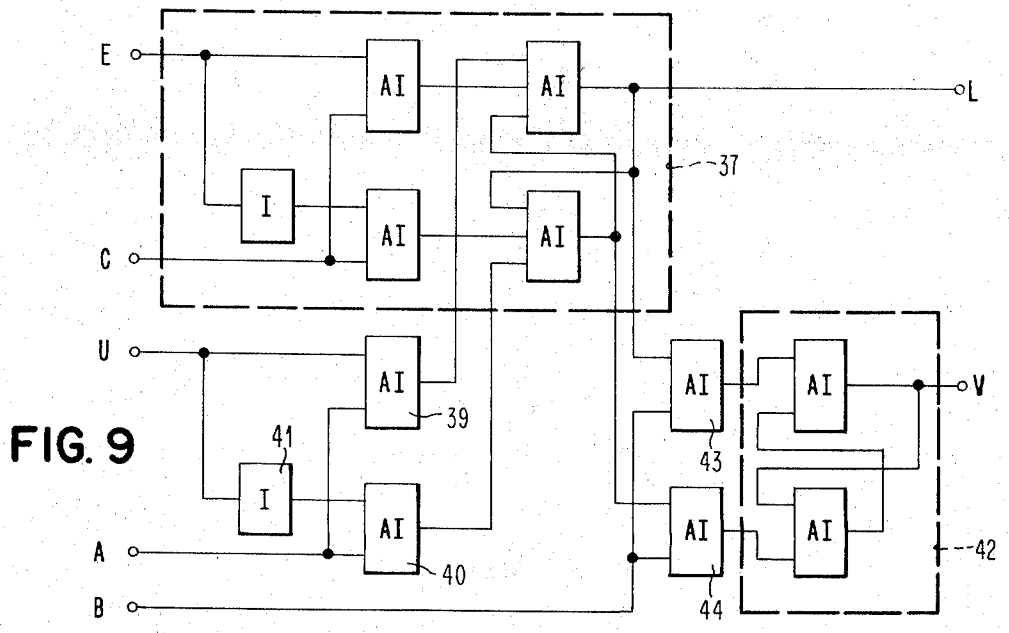
FIG. 9 is a block diagram of a clocked dc latch employed in the structure of FIG. 7 having provision for scan-in/scan-out.

Referring again to FIG. 7, each of the latch sets 33, 34 includes a plurality of the circuits shown in FIG. 9. The circuits are sequentially connected together such that the U input of FIG. 9 would be the input line 45 of FIG. 7. The A shift clock is applied to the first circuit (for example, circuit 37) of all of the latches of the sets. Similarly, the B shift clock is applied to the second circuit of each latch of the latch sets. The V output from circuit 42 of FIG. 9 would be coupled as the input to the next succeeding latch of the set until the last such latch of the entire register when this output would be the equivalent of the output line 46 from the arrangement of FIG. 7. The shift register latches are therefore interconnected with an input, an output and two shift clocks into a shift register.

To illustrate how the combinational network 30 of FIG. 7 may be tested, it is considered that a particular test pattern of binary ones and zeros is shifted into latch sets 33 and 34 through, in and under the control of shift clocks A and B. The test pattern is also applied to the system inputs S. After allowing time for the signals to propagate through latch set 34, clock C1 is turned on for a duration sufficient to store the set of excitation signals E1 that are gated by the gates G1 into latch set 33. The pattern in latch set 33 is shifted out through line 46 and a comparison is effected with the pattern expected as a response.

To accomplish the testing of combinational network 31, the same method is employed except that the response is shifted out of latch set 34. To test combinational network 32, a test pattern is shifted into latch sets 33, 34 and the result is obtained from the outputs R. To accomplish the testing of the shift register configuration, a short sequence of binary ones and binary zeros is shifted through it. It is also possible to apply both shift clocks A and B simultaneously. The shift register output response on line 46 is observed as the shift register input on line 45 is shifted back and forth between binary one and binary zero.

Any partitioning of the general structure shown in FIG. 7 results in a functional unit structure that may be tested in the same manner. All of the logic gates are tested with combinational tests by applying the appropriate test patterns at the set of inputs S and at the latch inputs and by shifting them into the shift register latches serially. The output patterns can be obtained from the response outputs R and by shifting out the bit pattern in the latches. This same method of testing is applicable irrespective of the level of packaging, such as the chip, module, card, board and system level.

Figure 8:
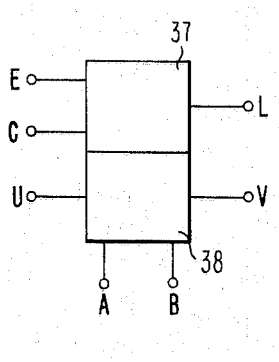
FIG. 8 is a symbolic representation of a latch configuration to be employed in the generalized structure of FIG. 7.
Figure 10:
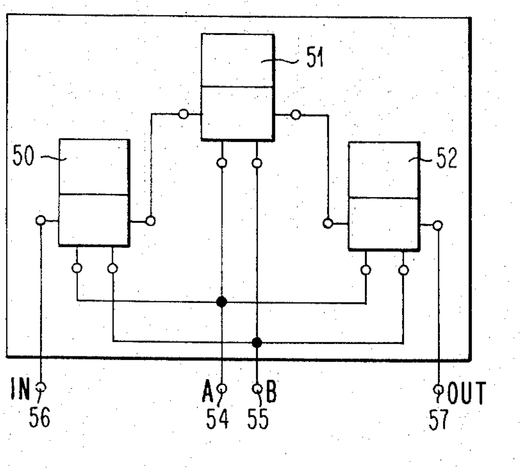
FIG. 10 is a symbolic illustration of the manner in which a plurality of the latches of FIG. 8 are interconnected on a single semiconductor chip device.

In FIG. 10, three latches of the type shown symbolically in FIG. 8 are indicated at 50, 51, 52 on chip 53. Each of the latches is coupled to shift controls A and B provided on lines 54, 55, respectively. The input pattern is provided to the first of these latches 50, through connection 56 and the individual latches are sequentially coupled together as described above in connection with FIGS. 7 and 9, so that the output is obtained on line 57.

Figure 11:
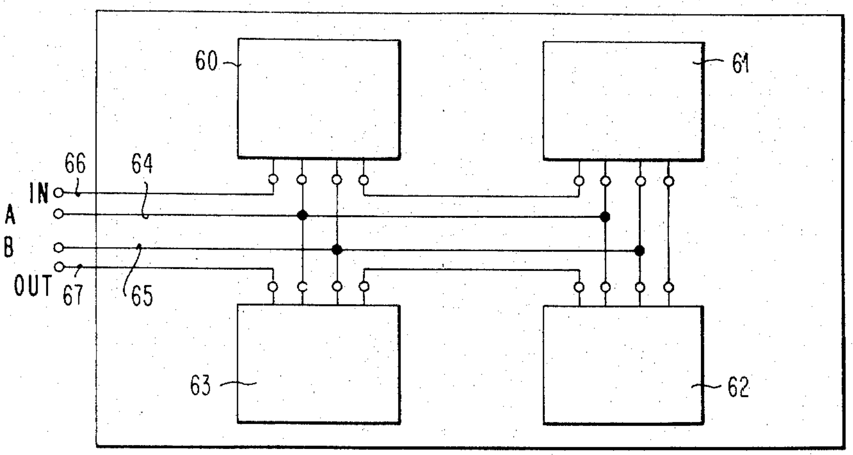
FIG. 11 is a symbolic illustration of the manner in which a plurality of such chip configurations are shown in FIG. 10 are interconnected on a module.

In FIG. 11, four such chips as shown in FIG. 10 are coupled together and indicated at 60, 61, 62, 63. Each of the shift controls A and B is provided through connections 64, 65 to each of the chips 60–63. The input pattern is provided to the first such chip in the sequential connection chip 60 through line 66, and the output is taken from line 67 from the sequentially connected chips 60–63.

Although the functional unit arrangement of the invention readily provides for the dc testing of the logic system, it also has the advantage of rendering the system relatively independent of transient or ac characteristics of the individual logic circuits in the system. This is readily observable when it is considered that at the time clock signal C1 is brought to an "up" level, some of the latches in latch set 33 (FIG. 7) may change state as a result of the excitation signals E1 and gating signals G1. The changes resulting in latch set 33 are required to propagate through combinational network 31. Excitation signals E2 and gating signals G2 must be stabilized before clock signal C2 is brought to an "up" level. Thus, the signals from latch set 33 are required to fully propagate through combinational network 31 during the interval between the beginning of the "up" state of clock signal C1 and the beginning of the "up" state of clock signal C2. In addition, the signals from latch set 34 are required to be fully propagated through combinational network 30 during the time between the beginning of the "up" state of clock signal C2 and the beginning of the "up" state of clock signal C1.

It is thus evident that the only ac requirement of this arrangement is that the worst case delays through networks 30, 31 must be less than some known values and there is no longer any need to control or test the individual rise times, fall times or minimum circuit delays. Only the maximum circuit delay need be controlled and measured. Only the total delays over paths from the input to the output of networks 30 and 31 need be measured.

One approach to accomplishing the testing for such delays is to evaluate automatically all delay paths and generate tests for them. This requires that a very effective algorithm be developed in order to obtain the objective of complete testing.

As a second approach, some fundamental test patterns are cycled through the system so that they test the worst case delay path. The shift register is useful in inserting the initial bit pattern and in inspecting the final bit pattern after a number of complete cycles.

Both approaches permit marginal testing to be performed. Since the delay time is measured by the time between clock signals, the clock is run faster than normal during the test to insure a margin of safety during actual system operation.

Referring again to FIGS. 8 and 9, the latch configurations operate such that as long as shift control signals A and B are both at a "down" or binary zero level, the portion 37 of FIG. 8 operates like a polarity hold latch as described in FIG. 3. The terminals U and V are the inputs and outputs, respectively, for the shift register. When operating as a shift register, data from the previous stage is gated into a polarity hold latch by the A shift signal changing to a binary one. After shift signal A has changed back to binary zero, the B shift signal gates the data in the latch into the output latch connected at 42 to output terminal V. Thus, shift signals A and B may not be at the binary one level at the same time if the shift register is to operate properly.

Modification of the polarity hold latch of FIG. 3 to include shift capability requires an additional clock input to the latch circuit and a second latch circuit to act as an intermediate or temporary storage during shifting. The basic latch cell of FIG. 3 is made somewhat more than two to three times as complex in the configuration of FIG. 9. The shifting circuits, that is, the shift controls at A and B, and the input pattern provided at U and the output taken at V, are not utilized during normal system operation. However, the interconnection of such a latch configuration into a shift register latch requires four additional input/output terminals at each level of packaging.

Figure 12:
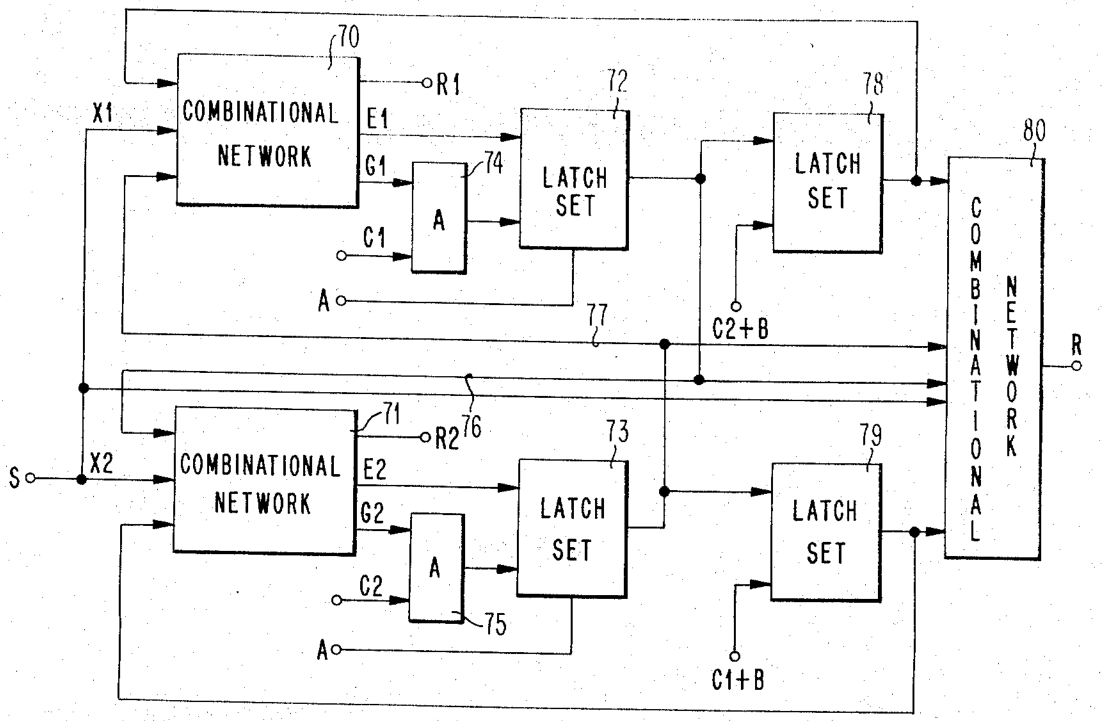
FIG. 12 is a schematic diagram of the organization of a generalized logic system having a modified form utilized in accomplishing the principles of the invention.

The logical organization of the invention also provides for optimizing the use of the shift register latches in the latch sets and to provide for the situation when a combinational network coupled into a latch set is of a simplex or trivial nature. Thus, as shown in FIG. 12, the sets of inputs S is provided in sub-sets X1 and X2 to combinational networks 70, 71, respectively. Each of these networks provides a set of excitation signals E1 and E2 and a set of gating signals G1 and G2. The excitation signals are applied directly to the respective latch sets 72, 73 under the control of the clocking and gating signals. Clock C1 controls latch set 72 through AND gate 74 which also receives gating signal set G1. Similarly, latch set 73 is controlled by clock train C2 through AND gate 75 which also receives gating signals G2. The sets of outputs provided from latch sets 72, 73 are cross coupled to combinational networks 71, 70, respectively, through connections 76, 77. Thus, far, the organization and structure of the logical system is the same as that described with respect to FIGS. 1 and 7.

However, if it is assumed that the combinational logic preceding latch sets 78, 79 is of the simplex or trivial type, then effectively the second storing circuit in each shift register latch of a latch set of the type shown in FIG. 9 may be employed for the latch sets 78, 79. As shown, latch set 78 is controlled either by clock train C2 or in the alternative during a scan-in/scan-out operation by the shift control B. Similarly, latch set 79 is controlled by clock train C1 or during the scan-in/scan-out operation by shift control B. During the scan-in/scan-out operation, the latch sets 72, 73 are both controlled by shift control A. The latch sets 78, 79 are coupled to a sub-system output combinational network 80 which also receives the outputs from latch sets 72, 73 and system input set S. Output R is provided by network 80 and is utilized in driving other functional logic units.

Figure 13:
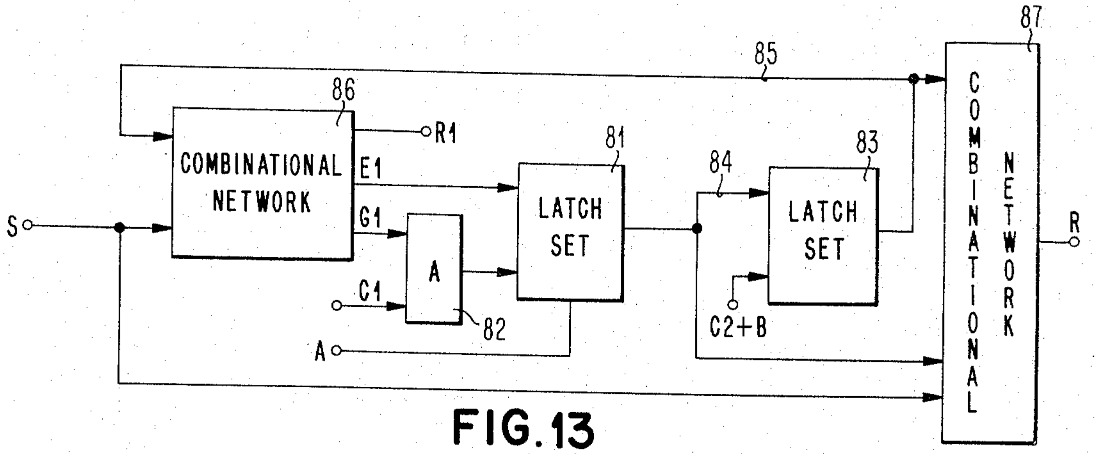
FIG. 13 is a schematic diagram of a simplex implementation of the organization of FIG. 12.
Figure 14:
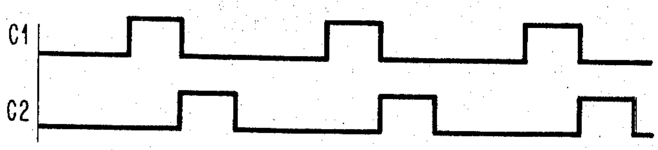
FIG. 14 is a timing diagram for the clock trains of the organization of FIG. 13.

In the simplest form, the logical organization of the invention provides, as shown in FIG. 13, a combinational network 86 receiving set S of input signals to provide a set of excitation signals E1 and a set of gating signals G1. Latch set 81 is controlled by clock train C1 through AND gate 82. The second latch set 83 effectively follows a simplex or trivial network and a direct coupling 84 is provided from set 81 to set 83. Latch set 83 is controlled by clock train C2, so that the latches in it are set to the levels determined on the set of input lines 84. The output of latch set 83 is applied to subsystem output combinational network 87 which also receives the outputs from latch set 81 and system input set S. Network 87 provides the set of responses R. The outputs of latch set 83 are coupled back through connection 85 to combinational network 86. During scan-in/scan-out, latch set 81 operates under the control of shift control A and latch set 83 under the control of shift control B. In operating the arrangement of FIG. 13, it is necessary that the clock trains follow the same requirements as described above. As shown in FIG. 14, the clock trains C1 and C2 are non-overlapping to optimize performance. A minimal amount of time should elapse between the fall of C1 and the rise of C2. The duration between the rise of clock train C2 and the commencement of the next succeeding "up" condition for train C1 would have to be at least as long as the propagation time through combinational network 86 and latch 83.

It is readily apparent that with the arrangement of FIGS. 12 and 13 more effective utilization is obtained for the shift register latches which as shown in FIG. 9 each consist of two storage circuits with the output of each one of the first storage circuits coupled to its corresponding second storage circuit. The second storage circuits are grouped for use as the latch sets 78 and 79 in FIG. 12 and 83 in FIG. 13. These circuits effectively serve the dual purpose of acting as the sequential circuit arrangement for the logical organization as well as providing the access during the scan-in-/scan-out operation.

The most significant advantage accruing from the shift register latch configuration is the provision of the ability to make dynamic measurements of logic networks that are buried within a particular logic package. The field serviceman debugging the machine or servicing it to monitor the state of every latch in the system can accomplish it using the invention of this application. This is achieved on a single cycle basis by shifting all the data in the latches to a display device. It does not disturb the state of the system, if the data is also shifted back into the latches in the same order as it is shifted out. Thus, the status of all latches is examined after each clock signal.

By having the ability to examine the status of all latches, the need for special test points is eliminated, allowing the logic designer to package the logic as densely as possible without concern for providing additional input/output lines for the field service engineer. With the ability to examine every latch in a system after each clock signal, any fault that occurs can be narrowed down to a particular combinational logic network whose inputs and outputs can be controlled.

With the four additional outputs required to implement this generalized system of logic, a standard interface is provided that allows greater flexibility to the designer and at operator or maintenance consoles. The consoles are changeable without in any way changing the logic system. These controls also enable diagnostic tests to be performed under the control of another processor or tester and for functions such as reset, initialization and error recording to be accomplished through the shift registers.

While this invention has been particularly described with reference to the preferred embodiments thereof, it will be understood by those skilled in the art that the foregoing and other changes in form and details may be made therein without departing from the spirit and scope of the invention.

What is claimed is:

1. A system of logic for performing at least one predetermined logical function in a general purpose digital computer, comprising means for generating a set of system input signals, means for generating a plurality of clock signal trains having a predetermined duration between the occurrence of signals in successive trains, a plurality of logic partitions, each of said partitions comprising a combinational network coupled to accept said set of input signals and to provide at least a first set of combinational signals, and sequential circuit means coupled to receive said first set of signals from the network in its partition under control of a selected one of said clock signal trains to store indications of the combinational logic of its associated network and to provide a set of outputs for said indications, means coupling said output indications from the sequential circuit means of each partition as a set of inputs to the combinational network of every other partition controlled by a clock signal train differing from the clock signal train exercising control in providing the set of output indications, and combinational means for accepting the sets of output indications to provide a logic system response.

2. The system of logic of claim 1, wherein at least one of said combinational networks is formed of plural stages of logic having a propagation time less than the predetermined duration.

3. The system of logic of claim 2, wherein a plurality of non-overlapping and independent clock sources provide the plural trains with the clock signals in each train having a duration sufficient to accomplish the clocking of the respective first sets of combinational signals into their associated sequential circuit means.

4. The system of logic of claim 3, wherein the number of said clock signal trains is equivalent to the number of partitions and the sequential circuit means of each partition is responsive to a distinct one of said clock signal trains.

5. The system of logic of claim 4, wherein said combinational network of each partition further provides a second set of combinational signals and means are provided in each partition to render the sequential circuit means responsive only to the presence of the second set of signals in that partition and the clock signal train provided to said partition to store the first set of combinational signals of that partition.

6. The logic system of claim 1, wherein the sequential circuit means of each partition is a set of clocked dc latches equivalent in number to the number in the first set of combinational signals for that partition for accepting as an input respective ones of said first set of combinational signals.

7. The logic system of claim 6, wherein said latches are polarity hold latches.

8. The logic system of claim 6, wherein said latches are clocked set-reset latches.

9. The logic system of claim 6, wherein each of said latches includes first and second bistable storage circuits connected with the output of the first storage circuit as an input to the second storage circuit, means for coupling an input signal to said first circuit independently of said first set of signals and for coupling an output signal from said second circuit, and means coupled to the first and second circuits of each of said latches for controlling the storing of signals in said circuits, whereby each of said latches is a shift register latch.

10. The logic system of claim 9, wehrein all of the shift register latches are coupled together sequentially into at least one shift register with the first circuit of the first latch in the sequence accepting the input and the last in the sequence providing the output and with the second circuit of the other latches connected to the first circuit of the latches following them.

11. A functional logic unit for use in a general purpose digital computer, comprising a plurality of networks at least one of which is a combinational logic network, at least one of said networks being responsive to a set of unit input signals with each network providing at least a first set of signals, means for generating a plurality of clock signal trains, plural sequential circuit means arranged in groups coupled to respective ones of said networks for receiving respective first sets of signals from said networks under control of predetermined ones of said clock signal trains to store indications of the signals from its associated network and to provide a set of outputs for said indications, means coupling said output indications from the respective groups of plural sequential circuit means as sets of inputs to all networks except a network coupled to a sequential circuit means controlled by the clock signal train exercising control in providing the set of output indications, and means for accepting the sets of output indications to provide a functional logic unit response.

12. The unit of claim 11, wherein the number of groups of sequential circuit means is equivalent to the number of clock signal trains and each group is controlled by a different one of said trains.

13. The unit of claim 12, wherein said trains are nonoverlapping and a predetermined duration exists between the occurrence of signals in successive trains, said duration being greater than the longest propagation time through said networks.

14. The unit of claim 12, wherein the combinational network further provides a second set of combinational signals and means are provided with each group of sequential circuit means coupled to said combinational network to render the groups responsive only to the presence of respective second sets of signals and the clock signal train for that group, whereby the first sets of signals from the networks are stored in respective groups.

15. The unit of claim 11, wherein each of the plural sequential circuit means includes means for providing access to them independent of the clock signal train control and the access means of each of said sequential circuit means are coupled together for providing scan-in/scan-out of said functional logic unit.

16. The unit of claim 15, wherein each of the sequential circuit means comprises first and second bistable storage circuits with the first of said circuits coupled to a respective one of said networks and to a clock signal train and operative to provide one of said set of outputs and said second bistable circuit is coupled to the output of the associated first bistable network, and said access means comprises input means coupled to said first circuit, output means coupled to said second circuit and means for controlling the entry of data into the first circuit and the exit of said data from the second circuit independent of the clock signal train control.

17. The unit of claim 16, wherein the entry and exit control means are coupled to all of said sequential circuit means and said sequential circuit means coupled together in cascade with the output of each said second bistable circuit except the last coupled as an input to the next succeeding first bistable circuit, the first bistable circuit receiving an independent data input and the last second bistable circuit providing an independent data output, whereby said plural sequential circuit means are coupled together as a register for accomplishing said scan-in/scan-out of said functional logic unit.

18. A functional logic unit for use in a general purpose digital computer, comprising a plurality of latches arranged in groups, means for generating a plurality of clock signal trains coupled to respective groups of said latches for controlling the latches, plural networks at least one of which is responsive to a set of unit input signals with each such network providing a set of network signal indications, means coupling the sets of network signal indications to respective groups of latches such that the indications are latched in the respective groups under the control of the respective clock signal trains, means coupling the outputs of the respective groups of latches as sets of inputs to all networks except a network coupled to a latch group controlled by the same clock signal train, and means coupling the outputs of the latch groups for providing a logic unit output indication that is a function of said set of unit input signals and said indications in the respective groups of latches.

19. The unit of claim 18, wherein means are provided between at least one latch group and its associated network for gating indications from the associated network on the clock train for that latch group.

20. The unit of claim 18, wherein each of the latches is a shift register latch and wherein the unit further comprises means coupling all of said latches together as a shift register, means providing access to and from said unit independent of said unit input signals, clock trains and logic unit output, and means for controlling said access to said unit, whereby scan-in/scan-out is accomplished.

* * * * *